United States Patent [19]

Bussiere et al.

[11] Patent Number: 5,653,394

[45] Date of Patent: Aug. 5, 1997

[54] DISINTEGRATION OF BALED CROP MATERIALS

[75] Inventors: Raymond Bussiere; Gilbert Topping, both of Vonda, Canada

[73] Assignee: Highline Mfg. Inc., Saskatchewan, Canada

[21] Appl. No.: 535,408

[22] Filed: Sep. 28, 1995

[51] Int. Cl.$^6$ ................................................ B02C 21/02
[52] U.S. Cl. ........................... 241/101.742; 241/101.761; 241/605
[58] Field of Search .................. 241/101.742, 101.761, 241/605, 186.35

[56] References Cited

U.S. PATENT DOCUMENTS

| | | | |
|---|---|---|---|
| 4,524,916 | 6/1985 | Keyes et al. | 241/605 X |
| 4,982,658 | 1/1991 | Knudson | 241/605 X |
| 5,090,630 | 2/1992 | Kopecky et al. | 241/279 |
| 5,209,413 | 5/1993 | Dwyer et al. | 241/101.7 |
| 5,211,345 | 5/1993 | Siebenga | 241/101.7 |
| 5,340,040 | 8/1994 | Bussiere et al. | 241/101.7 |

OTHER PUBLICATIONS

Bridgeview Mfg. Inc. brochure (2 pages) (No Date Given).

Primary Examiner—John M. Husar
Attorney, Agent, or Firm—Adrian D. Battison; Murray E. Thrift

[57] ABSTRACT

Apparatus for disintegrating bales comprises a hopper with vertical end walls and two side walls which converge inwardly and downwardly to a part cylindrical base portion extending longitudinally of the hopper. The upper face of the hopper defined at the top of the side and end walls is open to receive a bale dumped into the hopper. In the hopper is provided a pair of parallel rollers for supporting an rotating the bale when in the hopper. In the base portion is provided a flail roller which rotates about its axis grasping material and throwing it out of an exit slot longitudinally of the hopper at the base of the hopper. Rectangular bales are loaded into the hopper by an inclined ramp with a chain conveyor on the ramp, the ramp having a loading position in which it is inclined from a forward edge adjacent one side wall to a rear edge at the ground for pushing under the rectangular bale by which the bale is carried up the ramp to sit on the ramp. The ramp can then be raised to a discharge position in which it is inclined upwardly and rearwardly from the top edge of the end wall so the bale can be forced downwardly and forwardly into the hopper even though the bale may have a length greater than that of the hopper. To accommodate different types of bale, also the grid bars over the flail roller are commonly adjustable so that their height from the flail roller is adjusted by raising and lowering one end of the grid bars on a shaft extending along the length of the hopper and operable by a lever at one end.

9 Claims, 6 Drawing Sheets

DISINTEGRATION OF BALED CROP MATERIALS

BACKGROUND OF THE INVENTION

This invention relates to an apparatus for disintegrating baled crop materials.

One example of an apparatus of this type is disclosed in U.S. Pat. No. 5,340,040 (Bussiere et al.) assigned to the present assignee. The machine disclosed in this patent includes a hopper with sides walls which converge downwardly and inwardly toward a base with a disintegrating roller mounted at the base longitudinally of the hopper and generally parallel to the side walls. Two end walls are provided transverse to the side walls leaving an open top of the hopper into which crop materials can be fed in baled form. Within the hopper longitudinally of the disintegrating roller is provided a pair of support rollers which carry the baled material and rotate it for engagement with the disintegrating roller. An exit slot underneath the hopper is aligned with the disintegrating roller to discharge the material to one side.

This machine has achieved considerable success. The machine as originally designed was intended for cylindrical bales which generally have a diameter and cylindrical or axial length less than six feet so that the hopper was designed with these dimensions in mind.

The loading system for the cylindrical bales as shown in the patent comprises a pair of lift forks at one end of the hopper which engage under the bale with those lift forks being pivoted on lift arms about a pivot axis adjacent the top of the end wall of the hopper. The bale is thus lifted and turned upwardly and over the side wall and dropped into the hopper.

This loading technique is effective for cylindrical bales which are smaller than the hopper so they can simply be lifted and discharged into the hopper.

However the machine has significant difficulty in regard to rectangular bales which are generally less common than the cylindrical bales but are becoming more wide spread. Such rectangular bales are generally significantly larger so that they have a length of approximately eight feet with a height and width of the order of four feet. Such a bale is therefore very large and would not fit within the hopper as designed. It is of course possible to design a machine with a larger hopper but this increases the dimensions of the machine so that it would become less efficient in regard to the smaller cylindrical bales.

The above arrangement as shown in the patent has grid bars that are fixed and welded to the sides of the hopper. However in practice, as shown in a photograph of the machine as sold, each of the grid bars is mounted on the side wall so that one end can be raised and lowered by the addition of a selected number of shims. This adjustment is difficult to achieve since the operator must enter the hopper to effect the adjustment and since each grid bar is individually adjusted.

Another type of machine presently available in the marketplace is that manufactured by Haybuster and disclosed in their U.S. Pat. No. 4,449,672 (Morlock et al.). This type of bale disintegration machine has also achieved considerable commercial success but acts to load the bale in an entirely different manner by rotating the hole of the hopper so that one side wall rests on the ground allowing the bale to be lifted over that side wall as the hopper is tilted back to a more upright position. Again this arrangement is not designed for the large square bale.

SUMMARY OF THE INVENTION

It is one object of the present invention therefore to provide an improved machine for disintegration of bales which allows the loading of a large rectangular bale in a manner which causes the bale to be disintegrated within the hopper.

According to the invention there is provided an apparatus for disintegrating baled crop materials comprising a hopper for receiving and containing the baled crop materials, the hopper having two side walls which converge toward a base portion of the hopper extending along a longitudinal direction of the hopper and two end walls transverse to the side walls leaving an open top of the hopper through which the baled crop materials can be loaded, a disintegration member mounted in the hopper at said portion for rotation about an axis longitudinal of the hopper and carrying a plurality of radially extending crop material grasping members for engaging and grasping the crop material as the disintegration member rotates, elongate exit means in the hopper at said portion arranged longitudinally of the disintegration member for expulsion of the grasped crop material from the hopper, support means mounted in the hopper for supporting the baled crop material within the hopper and for rotating the baled crop material to pass across said disintegration member for engagement of different parts of the baled crop material with the disintegration member, and means for loading the baled crop material through the open top comprising a ramp member mounted at one end wall of the hopper so as to extend from the end wall away from the hopper, means mounting the ramp member for pivotal movement about an axis at an inner end of the ramp member which axis is parallel to the end wall such that an outer end of the ramp member can be raised and lowered between a lowered position at the ground for engaging baled crop material to be loaded and a raised loading position, the ramp member having an endless conveyor thereon with an upper run of the endless conveyor arranged to move the baled crop material longitudinally along the ramp member when supported by the ramp member in the raised loading position.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
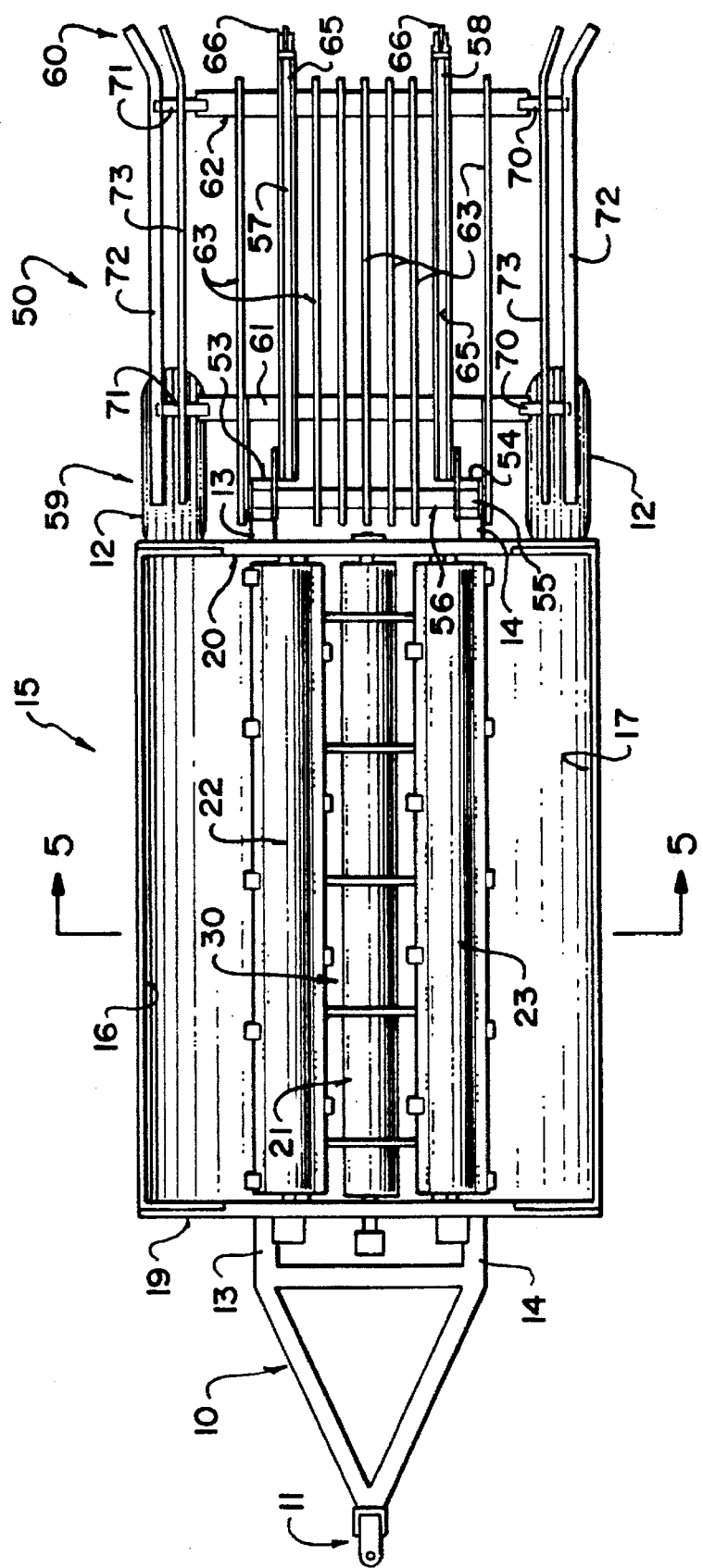
FIG. 1 is a top plan view of a bale disintegration apparatus according to the present invention.

References made to the above mentioned U.S. Pat. No. 5,340,040 the description of which is incorporated herein by reference which discloses the main structure of the present machine except for the modified or new elements described in detail hereinafter.

The present description will only therefore include the machine itself in general terms. The machine comprises a frame 10 having a hitch 11 at a forward end and ground wheels 12 at a rear end for movement of the frame across the ground. The frame includes a pair of parallel beams 13 and 14 which project along substantially the full length of the machine and project rearwardly to the rearwardmost part of the machine. On top of the frame 10 is mounted a hopper 15 which includes side walls 16 and 17 which converge inwardly and downwardly toward a base portion 18 of the hopper extending longitudinally of the hopper. The hopper further includes end walls including a front end wall 19 and a rear end wall 20 which are parallel and at right angles to the side walls. The end walls are generally vertical and do not converge in the manner of the side walls. A disintegration roller 21 is mounted on the base portion 18 and extends along the full length of the hopper. Two support rollers 22 and 23 are arranged within the hopper above the disintegration roller and spaced on either side of the disintegration roller leaving an open area 25 therebetween. A discharge slot 26 is arranged along the hopper adjacent the discharge roller to allow the escape of the material disintegrated from the bale. The disintegration roller includes a plurality of flails 27 at spaced positions along the length of the roller so as to grasp and discharge the material from the bale sitting on the support rollers 22 and 23 and presented at the opening 25.

Figure 5:
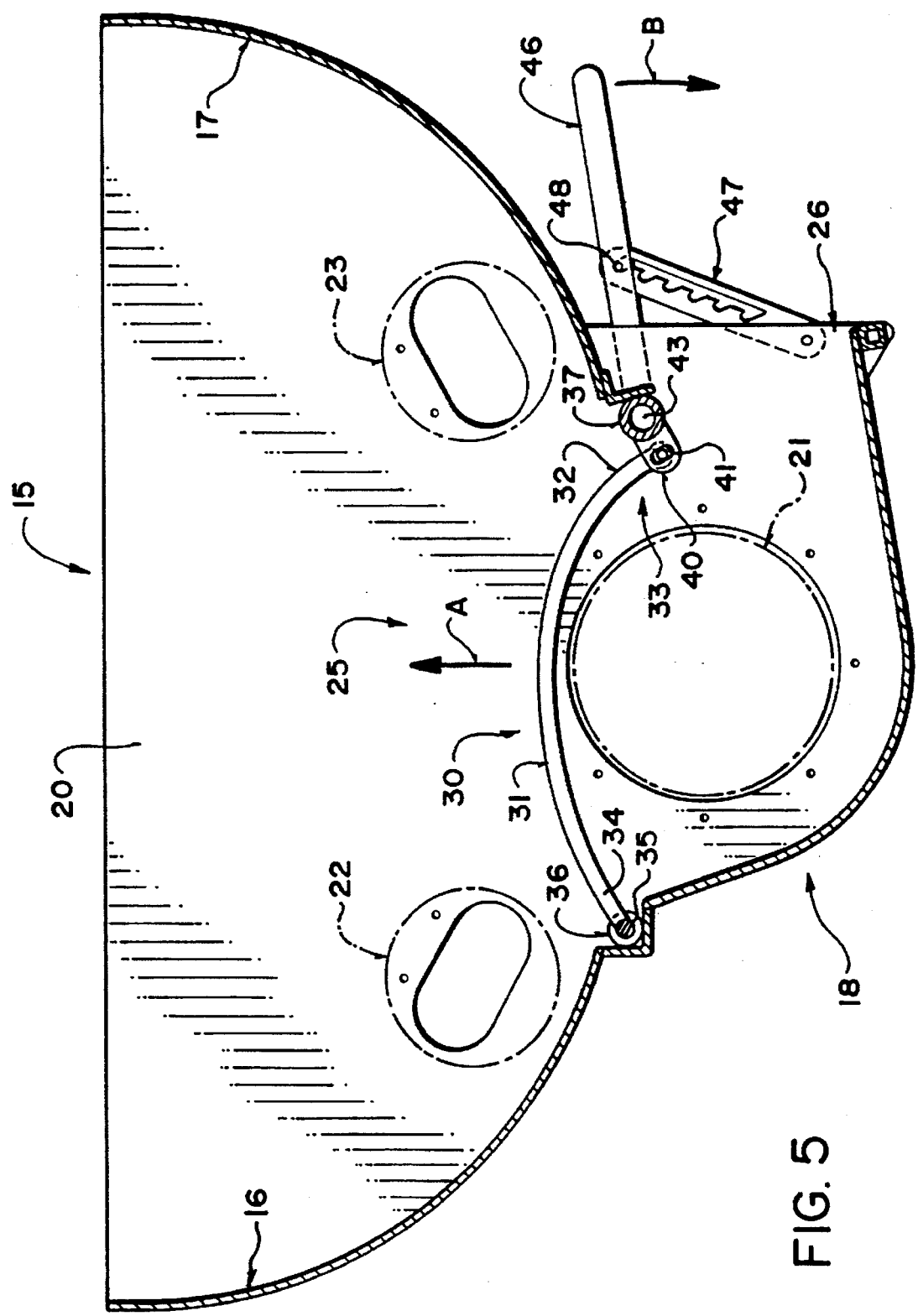
FIG. 5 is a cross sectional view along the lines 5—5 of FIG. 1.
Figure 6:
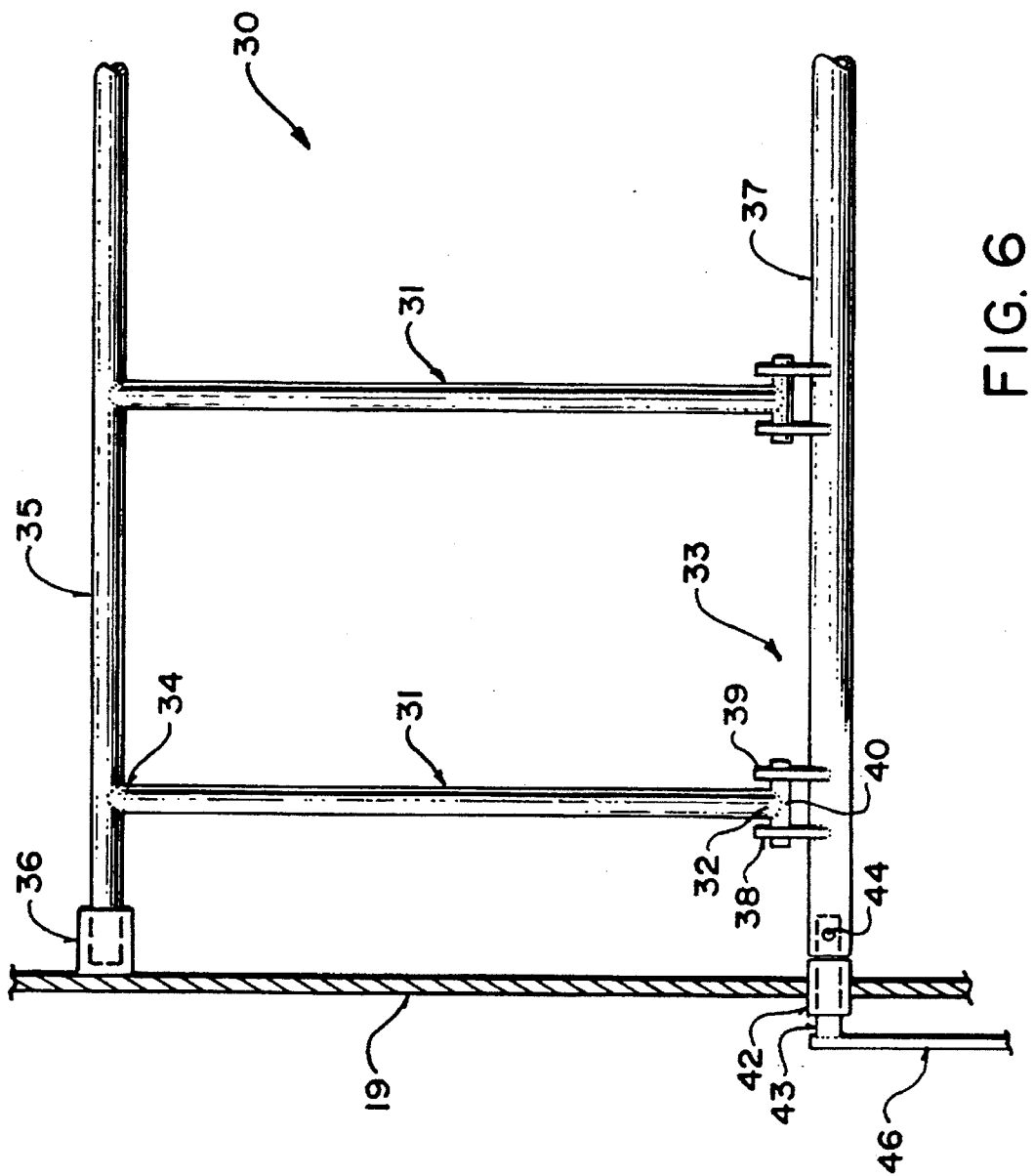
FIG. 6 is a schematic top plan view showing the grid bars and the mounting assembly therefor of FIG. 5.

Bridging the opening 25 underneath the rollers 22 and 23 is provided a grid bar system 30 including a plurality of grid bars 31 which are parallel and spaced along the length of the roller 21 and lying in planes radial to the roller 21. The grid bars as best shown in FIG. 5 arch over the roller 21 so as to engage the peripheral surface of the bale as it moves across the opening 25. The flails 27 interleave with the grid bars so as to grasp material between the grid bars for discharge.

At the rear of the frame 10 is provided a bale lifting assembly generally indicated at 50 for lifting the bale into the hopper.

The above description simply and generally describes the machine as disclosed in the above U.S. Patent for completeness for the present reader.

Turning now to the specific improvements with which the present invention is concerned, the grid bar system 30 is modified so that the grid bars 30 can be commonly adjusted to increase and decrease the spacing of the grid bars from the periphery of the disintegration roller 21 by raising and lowering the grid bars in the direction of the arrow A.

For this purpose the grid bars 31 have a first end 32 attached to a common adjustment system 33 and a second end 34 welded to a common longitudinal pivot bar 35. The pivot bar 35 to which each of the grid bars 31 is welded extends along the length of the hopper at one side of the base portion and is carried in end brackets 36 allowing the pivot bar 35 to rotate about an axis longitudinal to the pivot bar 35.

The common adjustment system 33 includes a pipe 37 extending along the full length of the hopper with the pipe carrying, for each of the grid bars, a pair of lugs 38, 39 which project radially outwardly from the pipe 37 in pairs with each of the pair on a respective side of the associated grid bar 31. A transverse pin 40 is welded to the end of each grid bar 31 at right angles to the grid bar and parallel to the pipe 37. The pin projects through holes 41 in the lugs 38, 39 so that the pin is held by the lugs and supported thereby at a position which is determined by the angular orientation of the pipe about its axis.

The pipe 37 is mounted in a pair of support brackets 42 each at a respective one of the end walls 19, 20. The bracket 42 as shown at the end wall 19 comprises a portion of pipe welded into the end wall with a shaft 43 projecting through the bushing defined by the pipe portion 42 into an open end of the pipe 37 to which it is attached by a pin 44. The rod 43 is attached to a handle 46 outside or forwardly of the end wall 19 so that the handle 46 can be manually grasped and moved in the direction of an arrow B. A locking bar 47 is provided which has a number of slots for cooperating with a pin 48 on the handle 46 so as to locate the handle at a number of predetermined angular positions around the axis of the pipe 37.

Thus it will be appreciated that the grid bars can be lifted in the direction of the arrow A so as to increase the spacing of the grid bars from the roller 21 by moving the lever in the direction of the arrow B. The lock bar 47 then acts to locate the handle 46 in the required position thus holding the grid bars at the set location providing a set spacing from the roller 21.

In order to accommodate the changing distance of the end of the grid bars and thus the pins 40 from the pipe 37 due to the pivotal movement of the ends of the grid bars around the rod 35, the holes 41 are formed as slots.

The adjustment of the grid bars provides an adjustment of the aggressiveness of the flails relative to the bale to accommodate different types and densities of baled crop material. This is necessary for the machine to accommodate the different types of bales with which it is designed to be used.

The adjustment can be effected quickly and easily by the operator to provide the maximum efficiency of disintegration consistent with the type of bale being used.

Turning now to the loading system 50 shown in FIGS. 1, 2, 3 and 4, the loading system comprises a ramp member 51 which is mounted on a stanchion 52 at the rear ends of the beams 13 and 14. The stanchion 52 comprises a pair of vertical posts 53 and 54 each standing up directly vertically from the respective one of beams 13, 14. At the top of the posts is provided a bearing assembly 55 carrying a transverse tube 56 on which the ramp member is mounted.

The ramp member 51 comprises a pair of longitudinal beams 57 and 58 extending substantially along the full length of the ramp member from a top end 59 to a lower end 60 of the ramp member. Across the beams 57 and 58 is welded two transverse beams 61 and 62 at right angles to the beams 57 and 58 and projecting outwardly beyond the sides of the beams 57 and 58. The length of the beams 61, 62 therefore defines the width of a base section of the ramp member.

Parallel to the beams 57 and 58 is provided a plurality of guide rods 63 which are welded at spaced positions across the width of the ramp member and extending substantially along the full length of the ramp member.

On top of the beams 57 and 58 are provided a pair of chain conveyors 65 each defined by a chain mounted for endless movement around a pair of sprockets 66 and 67 at the bottom end 60 and the top end 59 respectively of the ramp member. The sprockets 67 at the top end are mounted on a shaft 68 which is driven by a hydraulic motor 69 so that the chains 65 are driven along their length with an upper run of the chains positioned on top of the beams 57 and 58 to engage the baled material and to carry the bale longitudinally of the ramp member.

Figure 4:
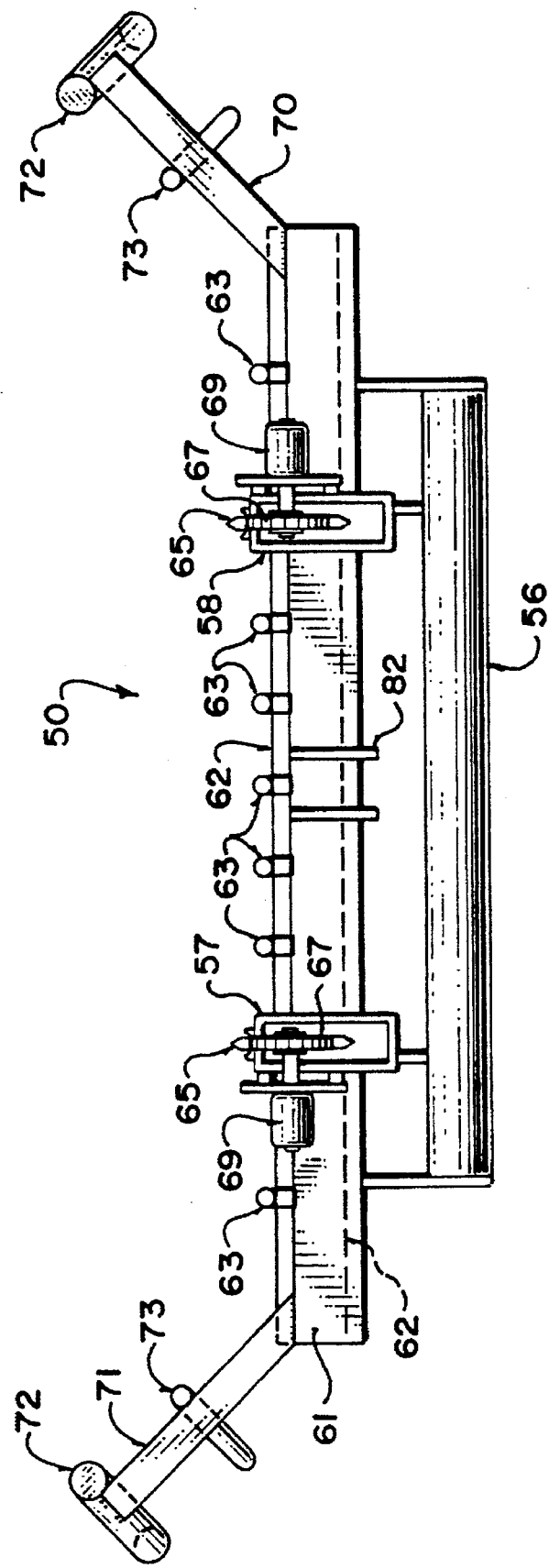
FIG. 4 is a cross sectional view along the lines 4—4 of FIG. 3.

At the ends of the beams 61 and 62 are mounted a pair of upwardly and outwardly inclined side rails 70 and 71 which carry guide rods 72 and 73 which are parallel to the rods 63 but raised upwardly and outwardly therefrom in the manner of a cradle as best shown in FIG. 4.

Figure 2:
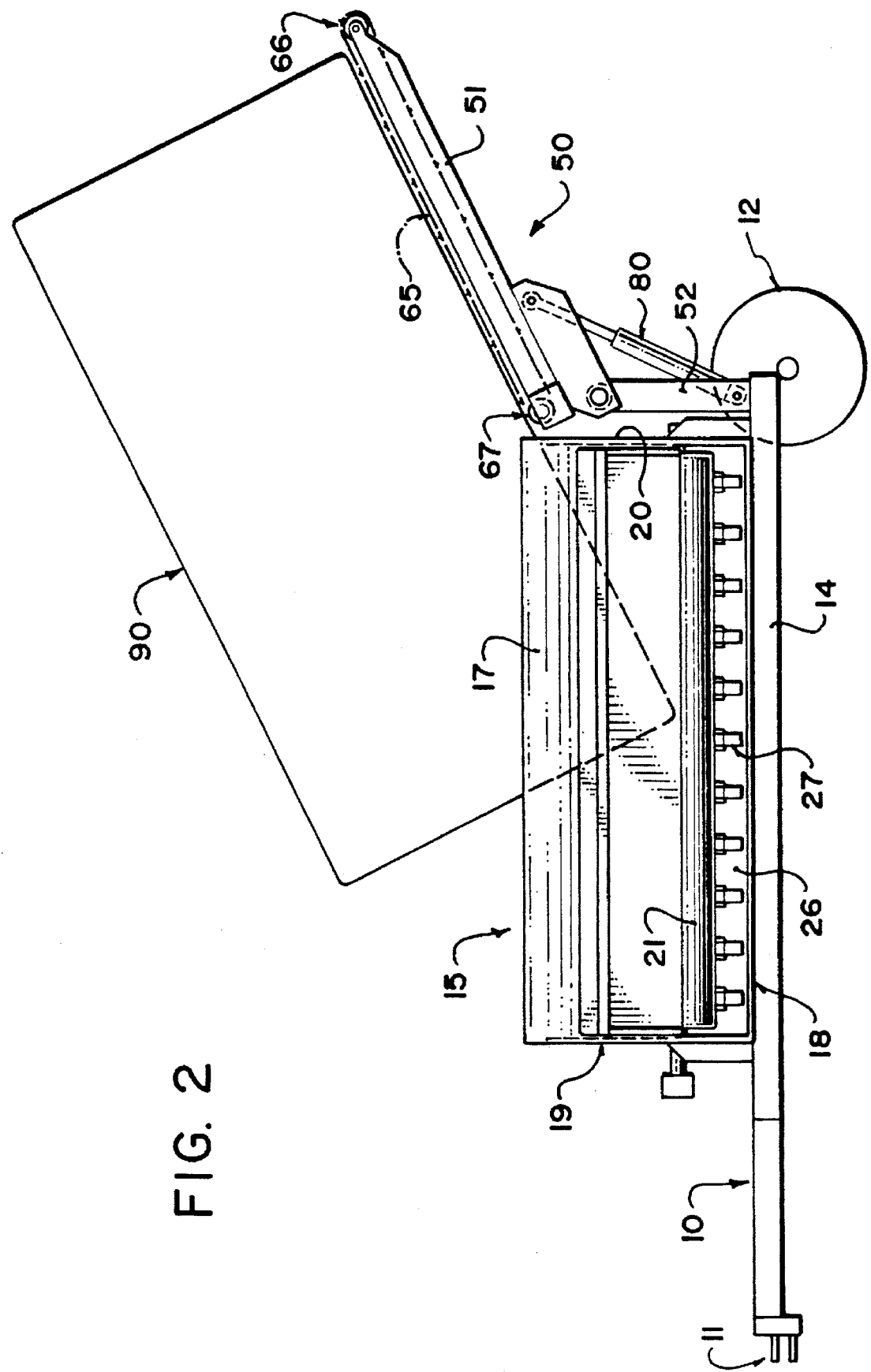
FIG. 2 is a side elevational view of the apparatus of FIG. 1 showing the disintegration of a rectangular bale.
Figure 3:
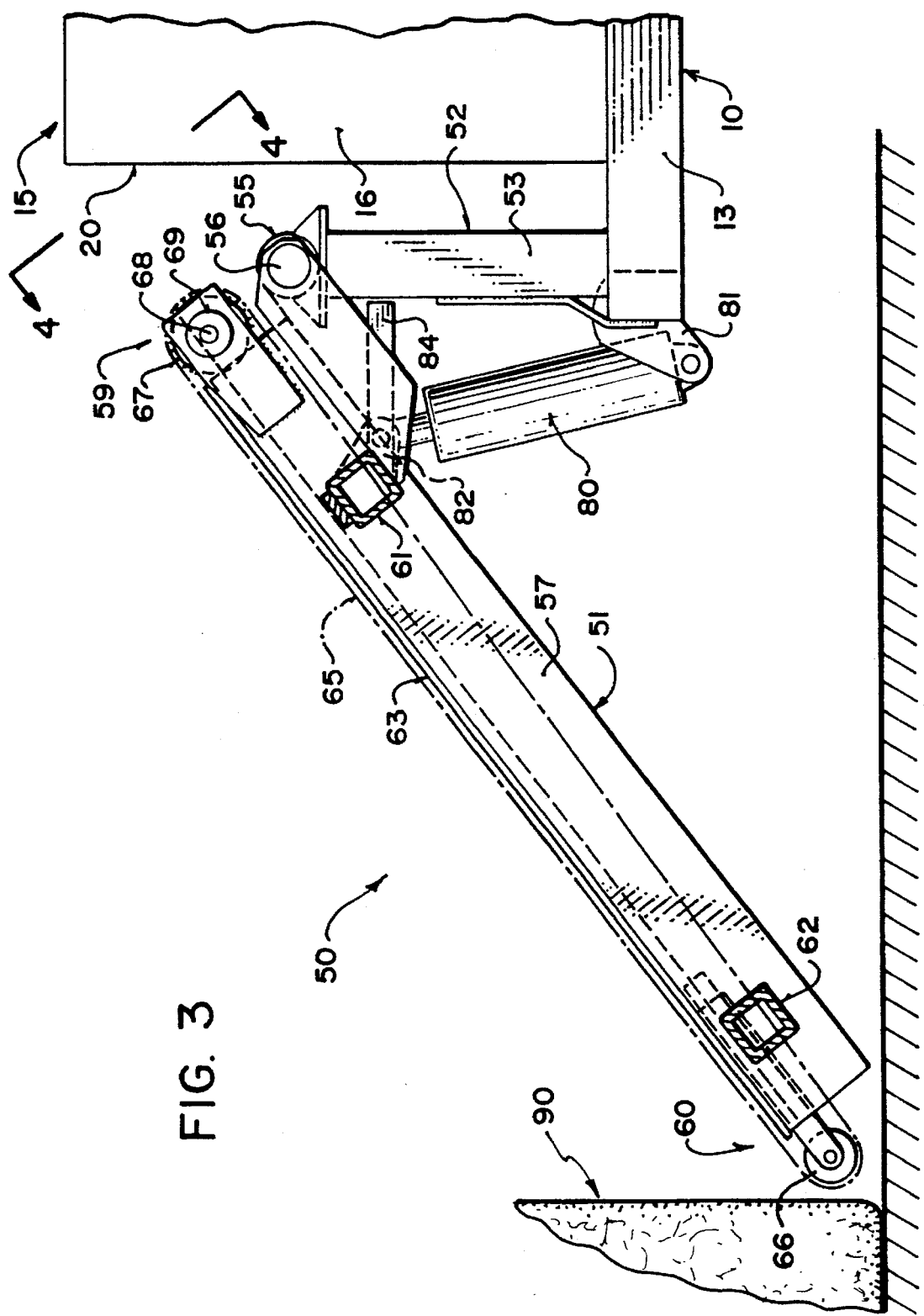
FIG. 3 is a side elevational view of the apparatus of FIG. 1 showing the ramp member for lifting the bale in a lowered position for loading the bale.

The ramp member can be moved from a lowered loading position shown in FIG. 3 to a raised discharge position shown in FIG. 2 by a pair of hydraulic cylinders 80 extending from a lug 81 at the rear end of a respective one of the beams 13, 14 to a lug 82 provided on the beam 61. In the lowered position shown in FIG. 3, a stop bar 84 extends from the beam 61 forwardly into engagement with the side of the posts 53 and 54 so that the ramp member is held at a position with its bottom end closely adjacent but not touching the ground.

The tube 56 is welded to the beams 61 and 62 and the beams 57 and 58 by stiffening plates extending longitudinally of the ramp member thus providing sufficient strength for the ramp member to carry the weight of the bale from the lowered position to the raised position.

In operation, the frame is backed up to a bale 90 awaiting loading. The lower end 60 of the ramp member is pushed against the bottom corner of the bale so that the ramp member begins to engage underneath the bale allowing the bale to be lifted onto the top surface of the ramp member provided by the guide rods 63 and chain 65. When sufficient of the bale is lifted onto the ramp member, the chain is started to drive the bale along the ramp member until it is balanced on the ramp member in a manner which allows the ramp member to be raised from the lowered position shown in FIG. 3 to an initial horizontal position.

In order for the bale to fed into the hopper, the ramp member is raised further to the position shown in FIG. 2 and the chain is driven so as to forward the bale into the hopper. As the bale is in some cases longer than the hopper, only a forward part of the bale can be fed into the hopper. When the forward part of the bale is so fed into the hopper, the disintegration system previously described is operated to provide disintegration of that part of the bale engaged into the hopper. During this disintegration action, the support rollers are operated to rotate back and forth in an oscillating action to provide some rotation effect on the bale while the chain conveyor is operated to push the bale further into the hopper. When enough of the bale is disintegrated by this combined effect, the remaining part of the bale is dumped into the hopper for disintegration while the bale remaining is rotated in the hopper by the support rollers.

The loading thus described enables the hopper which is of a dimension suitable for the small cylindrical bales to be used for the large rectangular bales. The loading system can be mounted on the frame in replacement for the loading system shown in the above patent which is used for the conventional cylindrical bale. The operator can therefore simply select the type of loading system that he wishes to use either on a permanent basis or on a temporary basis.

The adjustment of the grid bars allows the aggressiveness of the action of the flail roller or disintegration roller to be adjusted in dependence upon the type of bale being processed.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. Apparatus for disintegrating baled crop materials comprising:
    a hopper for receiving and containing the baled crop materials, the hopper having two side walls which converge toward a base portion of the hopper extending along a longitudinal direction of the hopper and two end walls transverse to the side walls leaving an open top of the hopper through which the baled crop materials can be loaded;
    a disintegration member mounted in the hopper at said base portion for rotation about an axis longitudinal of the hopper and carrying a plurality of radially extending crop material grasping members for engaging and grasping the crop material as the disintegration member rotates;
    elongate exit means in the hopper at said base portion arranged for expulsion of the grasped crop material from the hopper;
    support means mounted in the hopper for supporting the baled crop material within the hopper and for rotating the baled crop material to pass across said disintegration member for engagement of different parts of the baled crop material with the disintegration member;
    a ramp mounted with an inner end thereof at an upper edge of one end wall of the hopper so as to extend from the end wall away from the hopper;
    an endless conveyor mounted on the ramp with an upper run of the endless conveyor arranged to move the baled crop material longitudinally along the ramp;
    and means mounting the member for pivotal movement about an axis at an inner end of the ramp, which axis is parallel to the end wall such that an outer end of the ramp can be raised and lowered between a lowered position end a raised position;
    the lowered position of the outer end being arranged at the ground for engaging baled crop material to be disintegrated;
    and the raised position of the outer end being arranged such that the outer end is at a height above the upper edge and such that the ramp is inclined from the outer end downwardly and inwardly to the inner end at the upper edge of the end wall of the hopper;
    the angle of the ramp in the raised position and the conveyor being arranged such that the bale is pushed by the conveyor along the ramp into engagement with the disintegration member.

2. The apparatus according to claim 1 wherein the conveyor comprises a pair of parallel chains spaced toward each side of a main ramp surface of the ramp.

3. The apparatus according to claim 1 wherein the ramp includes a main ramp surface and a pair of cradle surfaces each arranged along a respective side of the main ramp surface and inclined upwardly and outwardly therefrom.

4. The apparatus according to claim 1 including a frame on which the hopper is mounted and ground wheels for movement of the frame across the ground to the baled crop material to be loaded wherein the frame includes a stanchion at an end thereof adjacent said one end wall of the hopper, the ramp being mounted on top of the stanchion.

5. The apparatus according to claim 4 including a hydraulic cylinder extending from the frame to the ramp for lifting the ramp member from the lowered position to the raised loading position.

6. The apparatus according to claim 1 including a plurality of grid bars mounted in the hopper over the disintegration member so as to engage the bale as the different parts thereof pass across the disintegration member, the grid bars each extending from a first end on one side of the disintegration member to an opposed end on an opposed side of the disintegration member, and grid bar adjustment means having said one ends of the grid bars being mounted on said grid bar adjustment means for common adjustment of the grid bars in a direction toward and away from the disintegration member.

7. The apparatus according to claim 6 wherein the grid bars are parallel and each lies in a plane substantially radial to the axis of rotation of the disintegration member with the crop material grasping members projecting therebetween and wherein the grid bars are arched around the disintegration member.

8. The apparatus according to claim 6 wherein the grid bar adjustment means comprises an elongate bar, means mounting the elongate bar along the hopper at said one ends of the grid bars, lever means for rotating the elongate bar about an axis longitudinal of the elongate bar and connecting means connecting said one ends of the grid bars to the elongate bar such that the ends are offset to one side of the elongate bar and such that rotation of the elongate bar about its axis causes transverse movement of said one ends.

9. The apparatus according to claim 8 wherein each grid bar is pivotal about its respective opposed end and wherein each connecting link is loosely connected to the end of the respective grid bar to allow relative movement therebetween to accommodate said pivotal movement.

* * * * *